United States Patent
Kumar et al.

(10) Patent No.: US 12,525,808 B2
(45) Date of Patent: Jan. 13, 2026

(54) TIME-SHIFTING OPTIMIZATIONS FOR RESOURCE GENERATION AND DISPATCH

(71) Applicant: MICROSOFT TECHNOLOGY LICENSING, LLC, Redmond, WA (US)

(72) Inventors: Peeyush Kumar, Seattle, WA (US);
Alireza Sadeghi, St. Paul, MN (US);
Srinivasan Iyengar, Bangalore (IN);
Shadi Abdollahian Noghabi, Redmond, WA (US); Shivkumar Kalyanaraman, Bangalore (IN);
Ranveer Chandra, Kirkland, WA (US);
Riyaz Pishori, Sammamish, WA (US);
Upendra Singh, Redmond, WA (US);
Weiwei Yang, Redmond, WA (US);
Swati Sharma, Hayward, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 601 days.

(21) Appl. No.: 17/742,380

(22) Filed: May 11, 2022

(65) Prior Publication Data
US 2023/0369863 A1  Nov. 16, 2023

(51) Int. Cl.
*H02J 3/38* (2006.01)
*G06N 20/00* (2019.01)
(Continued)

(52) U.S. Cl.
CPC ............. *H02J 3/381* (2013.01); *G06N 20/00* (2019.01); *H02J 3/003* (2020.01); *H02J 3/28* (2013.01);
(Continued)

(58) Field of Classification Search
CPC .... H02J 3/003; H02J 3/381; H02J 3/28; H02J 2300/24; H02J 2300/28; G06N 20/00
See application file for complete search history.

(56) References Cited

U.S. PATENT DOCUMENTS 8,311,681 B1  11/2012  Marcus
10,740,775 B2 *  8/2020  Hammerstrom ....... G05B 15/02
(Continued)

OTHER PUBLICATIONS

Nanduri, Vishnuteja, and Tapas K. Das. "A reinforcement learning model to assess market power under auction-based energy pricing." IEEE transactions on Power Systems 22.1 (2007): 85-95. (Year: 2007).*

(Continued)

*Primary Examiner* — Robert E Fennema
*Assistant Examiner* — Vi N Tran
(74) *Attorney, Agent, or Firm* — Newport IP, LLC; Jacob P. Rohwer

(57) ABSTRACT

The techniques disclosed herein enable systems to optimize generation and dispatch of renewable energies using data-driven models. In many contexts, a renewable energy system is collocated with a local consumer such as a datacenter, a smart building, and so forth. The objective of the renewable energy system is to meet local power needs while participating in various energy markets of differing trading frequencies. To optimally manage the renewable energy system, a data-driven model is configured to analyze current conditions and generate policies to control renewable energy system operations. For instance, the model can retrieve current market prices, generation capacity, costs associated with generating energy, and so forth. Based on the collected information, the model can generate a policy that maximizes revenue obtained by the renewable energy system while meeting local demand. Through many iterations, the model (Continued)

can determine a realistically optimal policy for managing the renewable energy system.

14 Claims, 10 Drawing Sheets

(51) Int. Cl.
  H02J 3/00 (2006.01)
  H02J 3/28 (2006.01)
(52) U.S. Cl.
  CPC ....... *H02J 2300/24* (2020.01); *H02J 2300/28* (2020.01)

(56) References Cited

U.S. PATENT DOCUMENTS

| | | | | |
|---|---|---|---|---|
| 2008/0046387 A1* | 2/2008 | Gopal | ................... | H02J 3/008 705/412 |
| 2011/0054642 A1* | 3/2011 | Bondar | ................. | G05B 15/02 700/32 |
| 2014/0039965 A1 | 2/2014 | Steven et al. | | |
| 2019/0036340 A1* | 1/2019 | Meeker | ................... | H02J 3/007 |
| 2019/0385182 A1 | 12/2019 | Price et al. | | |
| 2020/0348973 A1* | 11/2020 | Kutch | ..................... | H04L 43/08 |
| 2023/0361572 A1* | 11/2023 | Matan | ..................... | H02J 3/003 |

OTHER PUBLICATIONS

"International Search Report and Written Opinion Issued in PCT Application No. PCT/US23/017649", Mailed Date: Jun. 30, 2023, 16 Pages.

Dinkelbach, Werner, "On Nonlinear Fractional Programming", In Proceedings of Management Science, vol. 13, Issue 7, Mar. 1967, pp. 492-498.

Shen, et al., "Fractional programming for communication systems—Part I: Power control and beamforming", In Proceedings of IEEE Transactions on Signal Processing, vol. 66, Issue 10, May 15, 2018, pp. 2616-2630.

"ARK's Big Ideas Summit", Retrieved From: https://web.archive.org/web/20220125165758/https://www.youtube.com/watch?v=2iUxGm6hYAcs, Jan. 25, 2022, 5 Pages.

Sutton, et al., "Reinforcement Learning: An Introduction", In Publication of MIT Press, 2014, 352 Pages.

\* cited by examiner

TIME-SHIFTING OPTIMIZATIONS FOR RESOURCE GENERATION AND DISPATCH

BACKGROUND

Recent innovations in renewable energy systems, as well as concerns surrounding human induced climate change have greatly accelerated the adoption of renewable energy systems in modern power grids. While fossil fuels such as coal and natural gas continue to account for the majority of electricity generation, renewable energy sources such as wind and solar make up an increasingly large share of overall electricity generation. In a specific example, renewable energy sources accounted for twenty percent of total electricity generation in the United States in 2020. As various nations and communities aim to meaningfully reduce greenhouse gas emissions, expanded integration and widespread proliferation of renewable energy sources within the larger power grid represents a key priority.

Unfortunately, while technologies for generating electricity from renewable sources have seen marked improvements in cost and efficiency, significant challenges remain when considering how renewable energy systems can be integrated into existing infrastructure and energy markets. For instance, while wind and solar produce no emissions, these methods of electricity generation are not controllable unlike conventional power plants. Stated another way, the available supply of renewable energy systems can be subject to unpredictable conditions such as the weather and may not always be consistently available. While existing power grid infrastructure can accommodate a small number of renewable energy systems, the variability and uncertainty of renewable energy generation can pose serious challenges to reliability in grids composed mostly or entirely of renewable energy. For example, changing weather conditions can reduce the capacity of solar and wind power generation causing imbalance in the supply and demand of the electrical grid potentially leading to cascading blackouts.

To improve the reliability of renewable energy systems, many operators have turned to energy storage such as batteries or pumped hydro that is collocated with the electricity generation system. In this way, energy storage systems can smooth the fluctuations of renewable energy production ensuring a consistent supply of power. In addition, these energy storage systems enable operators to provide services in a wide variety of energy markets whereas renewable energy systems alone could only supply power in real time. Various energy markets can vary in timescale depending on the associated service. For instance, a power purchase agreement is a long-term contract operating on the scale of decades and includes penalties for non-delivery of power. In another example, operators can operate on the scale of days by committing power to the day-ahead market. At even smaller timescales, operators can participate on the scale of hours and even minutes through the real-time energy market and frequency regulation services respectively.

In addition, renewable energy systems may also be constructed to provide power locally (e.g., within a geographic region) for use by smart buildings, datacenters, and the like. As such, optimally managing a combined renewable generation and storage plant to meet local needs as well as serving various energy markets is a highly complex task. Considering the volatility of pricing across various energy markets, unpredictable renewable generation capacity, fluctuation in local demand, and other uncertain variables, manual management can become unfeasible. Thus, there is a need for automated systems to dynamically control renewable energy generation and storage systems.

SUMMARY

The disclosed techniques improve the functionality of renewable energy generation and storage systems by introducing a machine learning system that can generate a policy for governing resource generation systems based on data extracted from generation systems, local consumers, and the broader energy markets. For instance, a machine learning model can be configured to compute an optimal resource dispatch schedule that accommodates the needs of local consumers and the demands of energy markets under uncertain circumstances. As mentioned above, various markets can operate on drastically different transaction timescales from decades for power purchase agreements to seconds for frequency regulation services. In the context of renewable power generation, uncertainty arises from the unpredictability of power generation as subject to weather conditions as well as the volatility of energy prices in short-term energy markets such as day-ahead markets. Moreover, the needs of local consumers can be highly variable and unpredictable.

While many examples provided herein are described with respect to a renewable energy system, local power grids, and electricity markets, it is understood in the context of this disclosure that the techniques can be applied to any resource generation system, local consumer, and resource markets.

In various examples, a data-driven model can receive data defining a current state of an environment that includes a resource generation system, local consumers, and various associated resource markets. The state data can include various characteristics of the resource generation system such as available generation capacity, an amount of resource available for dispatch, and so forth. In addition, the current state data can also include current market conditions such as energy prices as well as demand of local consumers. The machine learning model can utilize any suitable machine learning approach such as reinforcement learning. Moreover, the state data can include historical information extracted from the environment that can enable the data-driven model to predict future conditions and formulate decisions accordingly. For instance, the historical information can be past energy prices as affected by energy demand and/or resource costs. In one example, the current price of coal can broadly impact future energy prices across the market as thermal power plants aim to generate profit relative to input costs.

Based on the state data, the data-driven model can compute a policy defining a series of actions that are to be applied to the resource generation system. In various examples, these actions can direct the resource generation system to generate and hold resources in storage. At a later point in time, another action of the policy may direct the resource storage to dispatch the resource. In another example, as mentioned above, the state data can include information pertaining to the broader energy market and not specifically the renewable energy system. By including market-relevant information, even for competing energy producers, the data-driven model can forecast market conditions and act accordingly. For example, if the current price of coal decreases, indicating that future energy prices may decrease in kind, the data-driven model may elect to hold energy in reserve until energy prices increase at a later point. In this way, the disclosed system can maximize revenue obtained.

For instance, an increase in demand of local consumers may cause a resource dispatch. Furthermore, the machine learning model can extract updated state data from the environment as well as a measure of optimality to quantify the success of the policy actions within the environment. In some contexts, the optimality can also be referred to as a reward.

Accordingly, the machine learning model can analyze the results of applying the policy and identify ways to increase the optimality of subsequent policies within the given environment. In this way, the machine learning model can iteratively generate policies that maximize optimality. Stated another way, the machine learning model enables the resource generation system to consistently satisfy the needs of local consumers while obtaining maximum revenue by trading energy in the energy markets.

Furthermore, the machine learning model can be configured with various physical and technical constraints of the resource generation system that cannot be violated. For example, in the context of renewable energy systems, the machine learning model can be configured with a maximum battery capacity. As such, the machine learning model will not direct the renewable energy generation system to charge the batteries beyond their maximum capacity. In another example, the machine learning model can be configured with constraints associated with physical laws such as the conservation of power. In this way, the machine learning model can be restricted to only generating policies that are safe and realistically feasible for a given system.

In addition, recent proliferation of small-scale production of renewable energy represents further opportunities to enhance energy systems and promote greater investment in sustainable power using the disclosed techniques. For example, an organization may construct a datacenter for providing cloud computing services. To operate the datacenter in an environmentally conscious manner, the organization may also construct a renewable energy system to power the datacenter using solar or wind energy. As power demands (e.g., the volume of computing) of the datacenter can fluctuate over time, the renewable energy system can dynamically dispatch electricity to the datacenter as well as various energy markets. In this way, the owner of the renewable energy system (e.g., the cloud computing organization) can recoup the cost of constructing renewable energy infrastructure over time.

In another example of the technical benefit of the present disclosure, the techniques described herein can reduce waste in renewable energy systems. Consider again a datacenter that is powered by a renewable energy system. As mentioned above, the disclosed system can balance the power demand of the datacenter as well as dispatch energy to various energy markets. In this way, surplus energy that may go unused for an extended period of time (e.g., stored in batteries) can be sold to satisfy external demand. Consequently, the operator can utilize the maximum available generation capacity of the renewable energy system and prevent energy from going to waste. In one example, a particularly sunny day can result in high generation capacity in solar panels which may meet and even exceed the needs of the datacenter. Excess energy generated by the solar panels can accordingly be dispatched to day-ahead energy markets to generate short term revenue. In this way, the combined datacenter and renewable energy system can serve a secondary function as an energy storage asset while performing its typical computational duties.

In still another example of the technical benefit of the present disclosure, the disclosed system can dynamically adjust the resource demand of local consumers according to priority, time-sensitivity, and other factors. For example, the datacenter mentioned above may be receive various workloads from users for execution. For typical systems, the workloads can simply be assigned to available computing infrastructure and executed immediately. In contrast, the disclosed system can schedule workloads to increase or decrease power consumption of the datacenter to suit current availability of power, computing infrastructure, and/or market conditions. For example, the system may detect that current demand is high at the energy markets causing an increase in pricing. In response, the system can reschedule low priority workloads at the datacenter to decrease power consumption thereby freeing up energy for sale. In this way, the system can maximize efficiency in the consumption of local consumers while obtaining maximum revenue in the energy markets.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
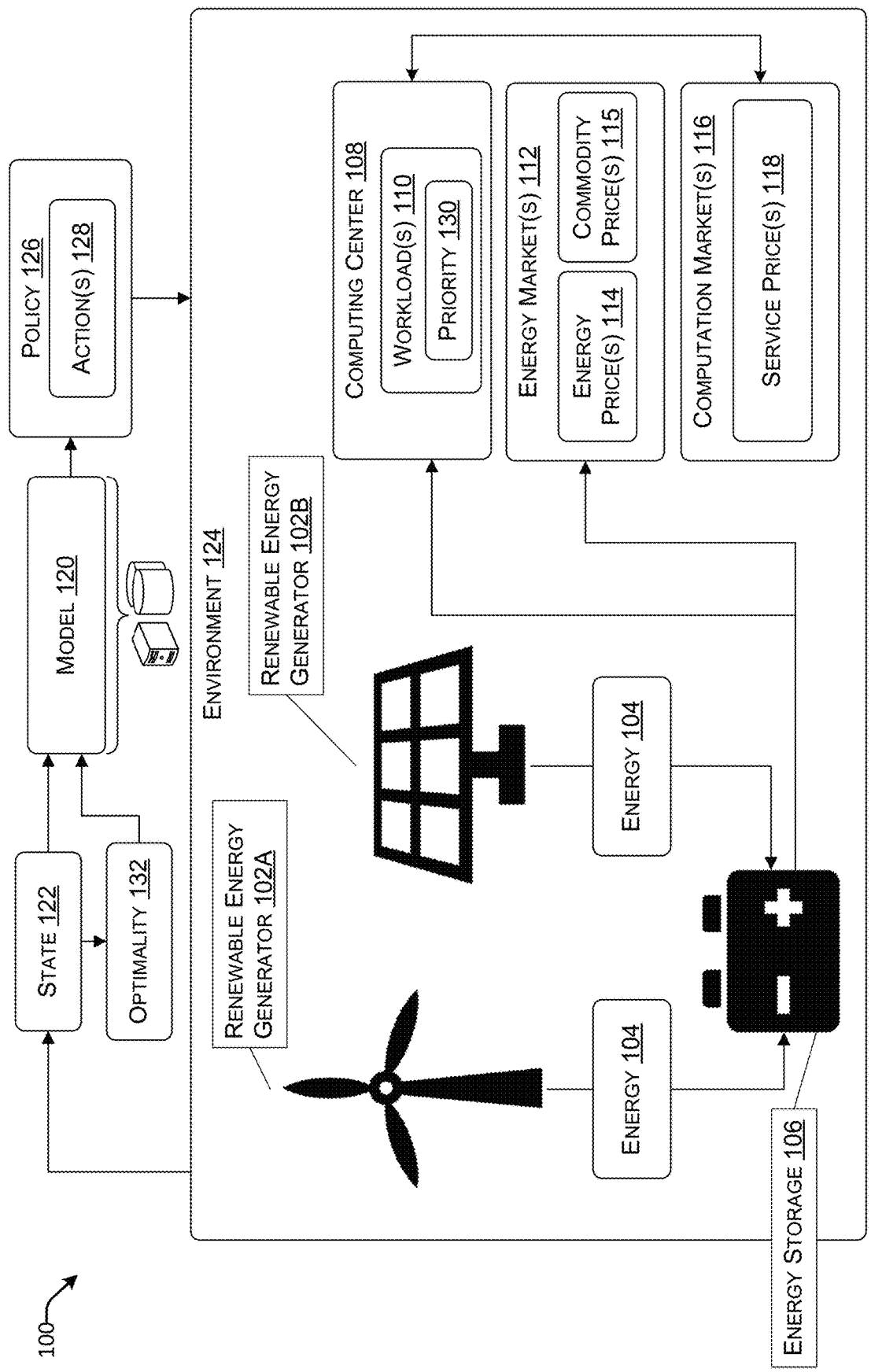
FIG. 1 illustrates an example configuration of a system for utilizing a model to compute policies for controlling resource generation and distribution within an environment.

The techniques described herein provide systems for enhancing the operation of resource generation and distribution systems by introducing a data-driven model-based approach to computing control policies for resource generation systems. As mentioned above, actions defined by a policy can direct the resource generation system to store and dispatch resources based on various factors such as local resource demand, the price associated with the resource, available generation capacity, and so forth. In addition, while the examples presented herein generally relate to renewable energy storage systems, it should be understood that these techniques can be applied to any resource generation system in which the resource generation rate is variable over time.

The disclosed system addresses several technical challenges associated with democratization and proliferation of renewable energy systems. For example, existing systems rely upon significant investment by large organizations such as utilities providers and local governments to construct and integrate solar and wind farms. However, there exists significant unrealized potential in relatively small-scale renewable generation such as power systems for datacenters, solar panels for homes and apartment buildings, and so forth. So-called microgrids have seen increased popularity in recent years as more organizations and individuals prioritize environmental impact. Unfortunately, the cost of constructing and implementing these so-called microgrids remains prohibitively high for many thereby preventing mass adoption of renewable energy systems.

Using the disclosed techniques, an operator (e.g., of a datacenter or of an apartment building) can be enabled to offset the initial cost of integrating a renewable energy system by dynamically dispatching energy to satisfy local needs as well as trading on the broader energy markets. As mentioned above, the generation rate of renewable energy systems can be unpredictable as subject to changeable conditions such as the weather. In one scenario, consider an agricultural farm that utilizes windmills for power generation. A particularly windy day can cause increased generation capacity that exceeds the needs of the farm. In response, the excess energy can be dispatched by the disclosed system to the wider grid for trading on the energy market. Alternatively, the energy can be stored in batteries for later use or until demand on the grid increases leading to a higher price. Such decisions can be made autonomously by the system as subject to battery dynamics, dynamics of local demand, market dynamics, and many other factors.

By enabling renewable energy systems to generate revenue in addition to satisfying local demand, the techniques disclosed herein can reduce costs associated with renewable energy systems and encourage widespread adoption. In addition, by enabling entities that typically only consume power (e.g., datacenters, residential buildings) to contribute power to the grid, the disclosed techniques can bolster availability of power to satisfy broad demand without reliance on fossil fuels. As mentioned above, generation capacity of renewable energy systems can be variable leading to uncertainty in the supply of electricity. By leveraging the capacity of many small-scale producers, the disclosed system can ensure steady production of power to consistently meet demand.

Various examples, scenarios, and aspects that enable time shifting optimizations for resource generation and dispatch are described below with reference to FIGS. 1-7.

FIG. 1 illustrates an example system 100 in which a renewable energy generator 102A and/or 102B produce energy 104 which is then stored in an energy storage 106. Alternatively, the energy 104 can bypass the energy storage 106 and be directly dispatched to various destinations such as a computing center 108. In various examples, the renewable energy generators 102 can be wind 102A, solar 102B, or any other renewable energy system. In addition, energy storage 106 can be any suitable storage method such as batteries, pumped hydro storage, and the like. Furthermore, the energy storage 106 can enable an operator to minimize fluctuations in production capacity of the renewable energy generators 102A and/or 102B.

As mentioned, energy 104 can be dispatched by the system 100 to various destinations such as the computing center 108 to enable processing of various workloads 110. In many examples, the computing center 108 can be collocated with the renewable energy generators 102. As such, the computing center 108 can be considered a local resource consumer. For instance, an operator of the computing center 108 may construct the renewable energy generators 102 to provide power to the computing center 108 and reduce the environmental impact of the computing center 108. Energy 104 can also be dispatched to various energy markets 112 for a specified energy price 114. In one example, the energy markets 112 can include a short-term market such as day-ahead or real time trading which operate on the scale of days or hours or frequency regulation services which operate in minutes or even seconds. In another instance, the energy markets 112 can include a long-term market which may operate in years or even decades. Naturally, energy prices 114 can be highly volatile especially for short-term energy markets 112 introducing a level of uncertainty to the system 100.

Furthermore, the computing center 108 can serve various computation markets 116 which can provide the workloads 110 for a specified service price 118. For example, the computing center 108 may provide processing services for large datasets, hosting services for websites, file storage services and so forth. As the needs of the computation markets 116 can be highly unpredictable, the demand of the resultant workloads 110 can introduce further uncertainty to the system 100. Thus, the function of the system 100 can be characterized as an optimization problem in which sufficient energy 104 must be provided to the computation center 108 to enable normal processing of the workloads 110 while also obtaining maximum revenue from the energy markets 112 as well as the computation markets 116. The combination of various revenue streams can be referred to as a value stack and the goal of the system 100 is to maximize the value stack.

To achieve this, the system 100 can employ a data-driven model 120 to extract a state 122 from the environment 124. In various examples, the environment 124 can contain the renewable energy generators 102, the energy storage 106, the computing center 108, the energy markets 112, and the computation market 116. The state 122 can include data the defines various characteristics of components of the environment such as available generation capacity of the renewable energy generators 102, the amount of energy 104 held in the energy storage 106, current demand of the computing center 108 due to the workloads 110, current energy prices 114, and so forth. Using the many factors defined by the state 122, the model 120 can determine a policy 126 that defines various actions 128 for application to the environment 124.

In addition, as mentioned above, the state 122 can also include information that is external to the renewable energy system (e.g., the renewable energy generators 102 and energy storage 106) such as commodity prices 115 for other energy producers (e.g., coal-fired thermal power plants). By including external information in the state 122, the model 120 can monitor broad market forces that can impact the energy prices 114. Accordingly, the model 120 can use this information to drive decision-making with respect the actions 128 defined by the policy. For instance, the state 122 can include the current price of coal which can affect energy prices 114 in the future. Stated another way, an increase in the price of coal can lead to an increase in energy prices 114 in various energy markets 112. In response, an action 128 of the policy 126 can direct the system to hold energy 104 in energy storage 106 as opposed to dispatching for immediate sale. In this way, the model 120 can maximize the revenue obtained.

In one example, an action 128 defined by the policy 126 can direct the renewable energy generators 102 to store a certain amount of energy 104 in the energy storage 106 (e.g., one hundred kilowatt hours). In another example, the action 128 can direct the energy storage 106 to dispatch energy 104 to the energy market 112 when the energy price 114 is favorable. For instance, the action 128 may configure the renewable energy system with a threshold energy price. If the energy price 114 meets or exceeds the threshold energy price, the energy storage 106 may dispatch energy 104 to the energy market 112.

Furthermore, the system 100 can be configured to dynamically scale energy consumption of the computing center 108 due to current market conditions. Consider a scenario in which demand in the energy markets 112 significantly increases driving up the energy prices 114. Accordingly, an action 128 of the policy 126 can configure the system 100 to reschedule workloads 110 at the computing center 108 to decrease the energy demand. In this way, energy 104 can be freed up for sale on the energy markets 112. In various examples, the workloads 110 can be rescheduled based on a priority 130 associated with each workload 110. For example, the system may detect that a workload 110 has a priority 110 that meets or exceeds a threshold priority, indicating that the workload 110 is important and needs immediate execution. As such, the high priority workload 110 can be processed by the computing center 108 without rescheduling.

Alternatively, the workload 110 may have a priority 130 that falls below the threshold priority, indicating that the workload 110 does not require immediate execution. Thus, the workload 110 can be scheduled for execution at a later time when the energy consumption of the computing center 108 can be scaled up. In another example, a workload 110 can be rescheduled even if it does have a high priority 130. For instance, the high priority workload 110 can be a regular synchronization of a client database and may only require execution once over a certain time period (e.g., once a week). Thus, the workload 110 can be rescheduled for execution at another time as long as the time requirement for the workload 110 is satisfied. In this example, revenue is maximized by decreasing energy 104 dispatched to the computing center 108 and increasing energy 104 dispatched to the energy markets 112.

In another example, the computation market 116 may experience increased demand resulting in a large number of workloads 110. As such, the system 100 may determine that scaling up the performance of the computing center 108 to handle the increased workloads 110 would be advantageous for maximizing value for a given amount of energy 104. In response, an action 128 of the policy 126 can configure the computing center 108 to increase performance thereby drawing more energy 104. In this scenario, revenue is maximized by dispatching less energy 104 for sale at the energy markets 112 while more energy 104 is dispatched to the computing center 108.

In still another example, the performance of the computing center 108 can be scaled down to reduce power consumption. In some examples, performance can be scaled down by disabling computing cores (e.g., CPUs or GPUs), reducing clock speeds, and so forth. Accordingly, the workloads 110 currently scheduled for execution may require additional time to process which can be accounted for by the model 120. For instance, the model 120 may determine that diverting some energy 104 from the computing center 108 to the energy market 112 for a predetermined period of time (e.g., one hour) is most likely to increase overall revenue. In response, an action 128 of the policy 126 can reduce the performance of the computing center 108 to free up energy 104 for dispatch to the energy markets 112. Once the predetermined period of time has elapsed, the performance of the computing center 108 can be increased to normal levels thereby increasing consumption of energy 104.

Following application of the actions 128 defined by the policy 126, the model 120 can be configured to extract a state 122 that is changed as a result of the policy 126. The state 122 can now define the various aspects of the environment 124 that changed in response to the various actions 128 defined by the policy 126. For example, the amount of energy 104 dispatched to the computer center 108 and/or the energy markets 112, workloads 110 received from the computation markets 116, the amount of energy 104 generated by the renewable energy generators 102, and so forth. From the state 122, the model 120 can calculate an optimality 132 that captures and/or quantifies the efficacy of the policy 126. From this analysis, the model 120 can adjust, modify, or remove actions 128 to generate a new iteration of the policy 126. In this way, the system 100 can reach a realistically optimal set of actions 128 to maximize the value stack of the environment 124 across various scenarios.

Figure 2:
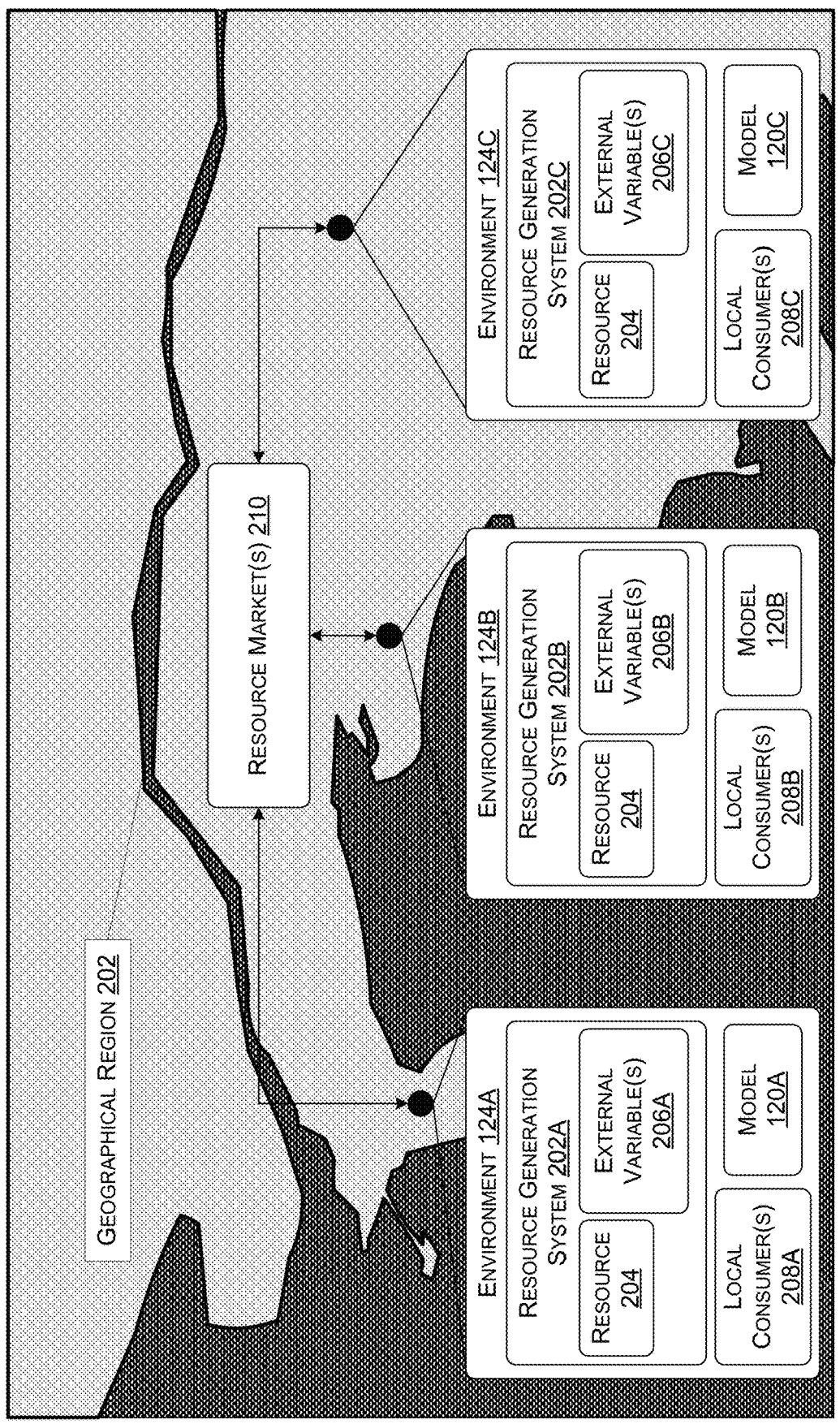
FIG. 2 illustrates an example scenario in which several environments are located within a geographic region.

Turning now to FIG. 2, an example scenario 200 is shown and described in which several environments 124A-124C are located within a geographical region 202. Each environment 124 can include a resource generation system 202 such as the renewable energy generators 102 discussed above. It should be understood that the example described with respect to FIG. 1 is merely illustrative and that the resource generation system 202 can be any system in which a resource 204 is generated at a variable rate subject to external variables 206 and dispatched to a local consumer 208 and/or a resource market 210.

For instance, part of the resource generation system 202 may include resource generation entities such as farms in which the resource 204 can be an agricultural product such as grain. In this example, the grain can be dispatched to a resource market 210 such as a commodity market and/or sold to local consumers 208 to satisfy local needs. It should be understood that local consumers 208 can be any entity that is collocated with the resource generation system 202 in the environment 124. For instance, in the context of renewable energy, the local consumer can be a computing center 108 as shown in FIG. 1 or other system which requires electricity such as a residential building, a manufacturing facility, and so forth.

In addition, each environment 124 can include a data-driven model 120 that manages the resource generation system 202 through various policies 126 and actions 128 as described above. For instance, while each environment 124 may produce the same resource 204 (e.g., electricity, grain) the policies 126 developed by a model 120A for a resource generation system 202A may differ from policies 126 developed by another model 120B for another resource generation system 202B. This can be due to differing external variables 206A and 206B that affect various factors such as the rate at which the resource 204 can be generated at the different environments 124A and 124B. For instance, consider again a renewable energy system such as the one illustrated in FIG. 1. In this example, the environment 124A may tend to receive more sunlight during a particular time period (e.g., the summer months) than the environment 124B. Consequently, solar panels within the resource generation system 202A may produce more of the resource 204 than is needed by the local consumers 208A. Conversely, the resource generation system 202B may produce enough of the resource 204 to meet but not exceed the needs of local consumers 208B. Thus, the model 120A may direct the resource generation system 202A to dispatch some resource 204 to the resource markets 210. In contrast, the model 120B may direct the resource generation system 202B to store the resource 204 for use by the local consumers 208B.

Moreover, resources 204 that are dispatched by an environment 124A to the resource markets 210 can be utilized to satisfy demand at another environment 124C. Continuing with the example above, external variables 206C at the environment 124C may cause reduced generation capacity of the resource generation system 202C. For instance, unexpectedly cloudy weather at the environment 124C may prevent solar panels from generating sufficient electricity for the local consumers 208C. Accordingly, the data-driven model 120C can direct the resource generation system 202C to supplement current generation capacity with resources 204 purchased from the environment 124A via the resource markets 210. In this way, the disclosed system can enable an environment 124A to ensure that the demand of local consumers 208A is met while also assisting neighboring environments 124B and/or 124C.

Figure 3A:
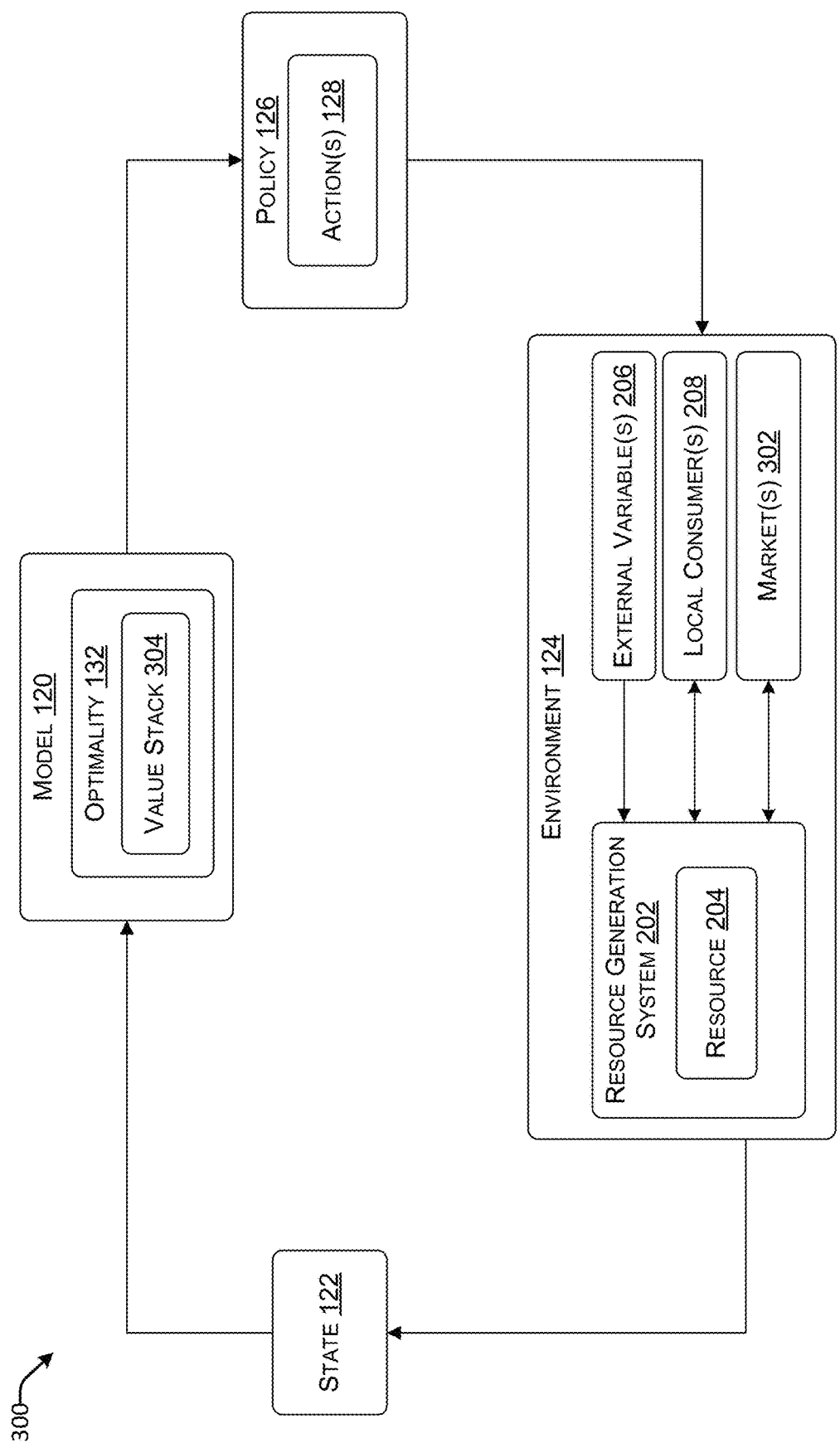
FIG. 3A illustrates a system for utilizing a model to compute policies for controlling resource generation and distribution.

Turning now to FIG. 3A, additional aspects of a resource generation and distribution system 200 are shown and described. As mentioned above, while the examples described herein may have specific applicability to renewable energy systems, the disclosed techniques can be used in association with any resource generation system 202 in which the rate at which the associated resource 204 is generated varies over time. Within the environment 124, the generation and distribution of the resource 204 can be governed by a policy 126 defining various actions 128 and subject to various external variables 206. The external variables 206 can include a generation capacity of the resource 204, demand and associated pricing for the resource 204, and the like.

The actions 128 can be determined by the model 120 based on a state 122 which is retrieved or extracted from the environment 124. As will be discussed below, the state 122 can define various aspects of the environment 124 to enable the model 120 to make informed decisions. For instance, the model 120 can be configured to maximize revenue obtained from various markets 302. As described above, applying the actions 128 defined by the policy 126 to the environment 124 can change various aspects of the environment 124 which can be captured in an updated state 122. From an analysis of the updated state 122, the model 120 can calculate an optimality 132 to quantify the efficacy of the policy 126. In various examples, a value stack 304 can be derived from the optimality 132. As will be discussed below, the value stack 304 can capture the allocation of resources 204 to various local consumers 208 and/or markets 302 as well as the value generated by the policy 126 and the actions 128.

Figure 3B:
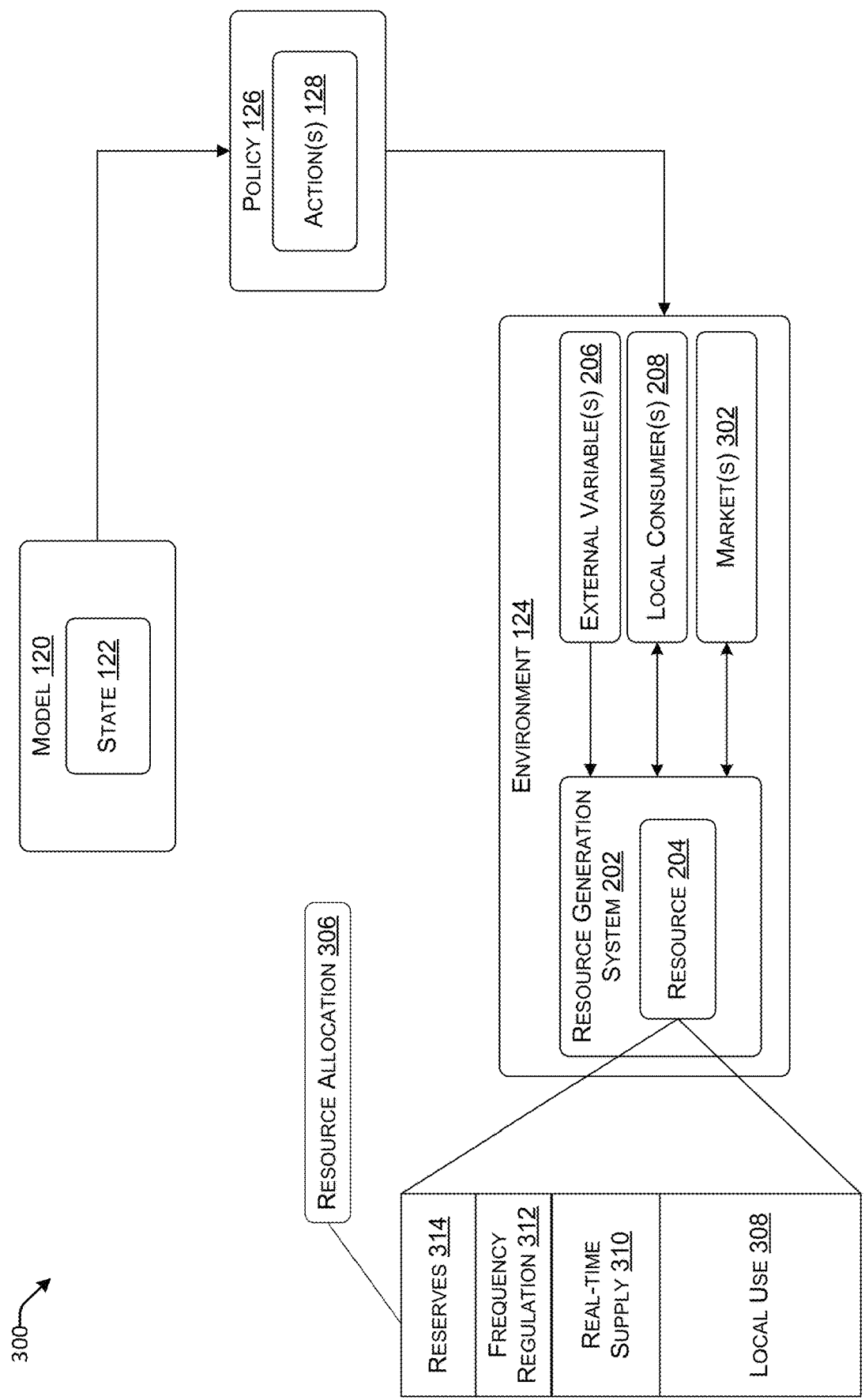
FIG. 3B illustrates a first state of the system for utilizing a model to compute policies for controlling resource generation and distribution.

Turning now to FIG. 3B, a first state of the iterative policy process is shown and described. As mentioned above, the model 120 can retrieve a state 122 from the environment 124. The state 122 can define a level of generation for the resource generation system 202, current demand for the resource 204, market commitments, an amount of the resource 204 available in storage, and other external variables 206. In subsequent iterations, the state 122 may also include information on policies 126 that were implemented in previous iterations. For instance, the state 122 may define actions 128 that were previously applied to the environment 124 and the effects of those actions 128 on the environment 124.

Based on the state 122, the model 120 can compute a policy 126 which defines various actions 128 for implementation within the environment 124. As discussed above with respect to a renewable energy generation system, the policy can direct the resource generation system 202 to utilize available generation capacity, store a certain amount of resource 204, dispatch the resource 204 to local consumers 208 and/or various markets 302, and the like. These operations can be achieved by defining a set of discrete actions 128 within a policy 126. In various examples, the actions 128 can be performed at regular time intervals (e.g., at each time t). Alternatively, the actions 128 can be defined for certain periods of time. For instance, an action 128 may direct the resource generation system 202 to produce and store the resource 204 for two hours and then dispatch the resource 204 for thirty minutes.

In addition, as shown in FIG. 3B, the resource 204 can be partitioned into a resource allocation 306 that can define an amount of the resource 204 that is dispatched to local consumers 208 and/or the markets 302. For instance, the model 120 may determine a projected or future resource requirement for the local consumers 208 based on current demand extracted from the state 122. Accordingly, an action 128 of the policy 126 may direct the resource generation system 202 to allocate a portion of the resource 204 for local use 308 by the local consumers 208. In the context of renewable energy, the local consumers 208 can be residential buildings while local use 308 can be the power consumption of the residential buildings. In another example, the local consumer 208 can be a computing center 108 as shown in FIG. 1 and the local use 308 can be the amount of energy consumed by the computing center 108 to execute the various workloads 110.

Furthermore, the resource allocation 306 can specify a quantity of the resource 204 which can be dispatched to the markets 302. Continuing with the example of renewable energy, the markets 302 can include various energy markets such as real-time supply 310 and frequency regulation 312. As mentioned above, the various markets 302 can differ in time scale and thus trading frequency. For instance, markets 302 such as real-time supply 310 may operate in terms of hours while frequency regulation 312 can operate in terms of minutes or even seconds. Moreover, some markets 302 such as a day-ahead market can operate in terms days and some markets 302 such as power purchase agreements can be in effect for years or even decades.

As such, the policy 126 must consider the effect of external variables 206 such as currently available generation capacity to ensure that the resource generation system 202 can satisfy the needs of local consumers 208 as well as commitments in the various markets 302. To that end, an action 128 of the policy 126 can additionally direct the resource generation system 202 to hold some of the resource 204 in reserves 314. In this way, the resource generation system 202 can maintain a consistent supply of the resource 204 despite inconsistencies that result from the external variables 206. It should be understood that the resource allocation 306 can be considered a component of the value stack 304. This is because as the proportion of the resource 204 for various sectors of the resource allocation 306 change, the revenue obtained by the resource generation system 202 can change as a result.

Figure 3C:
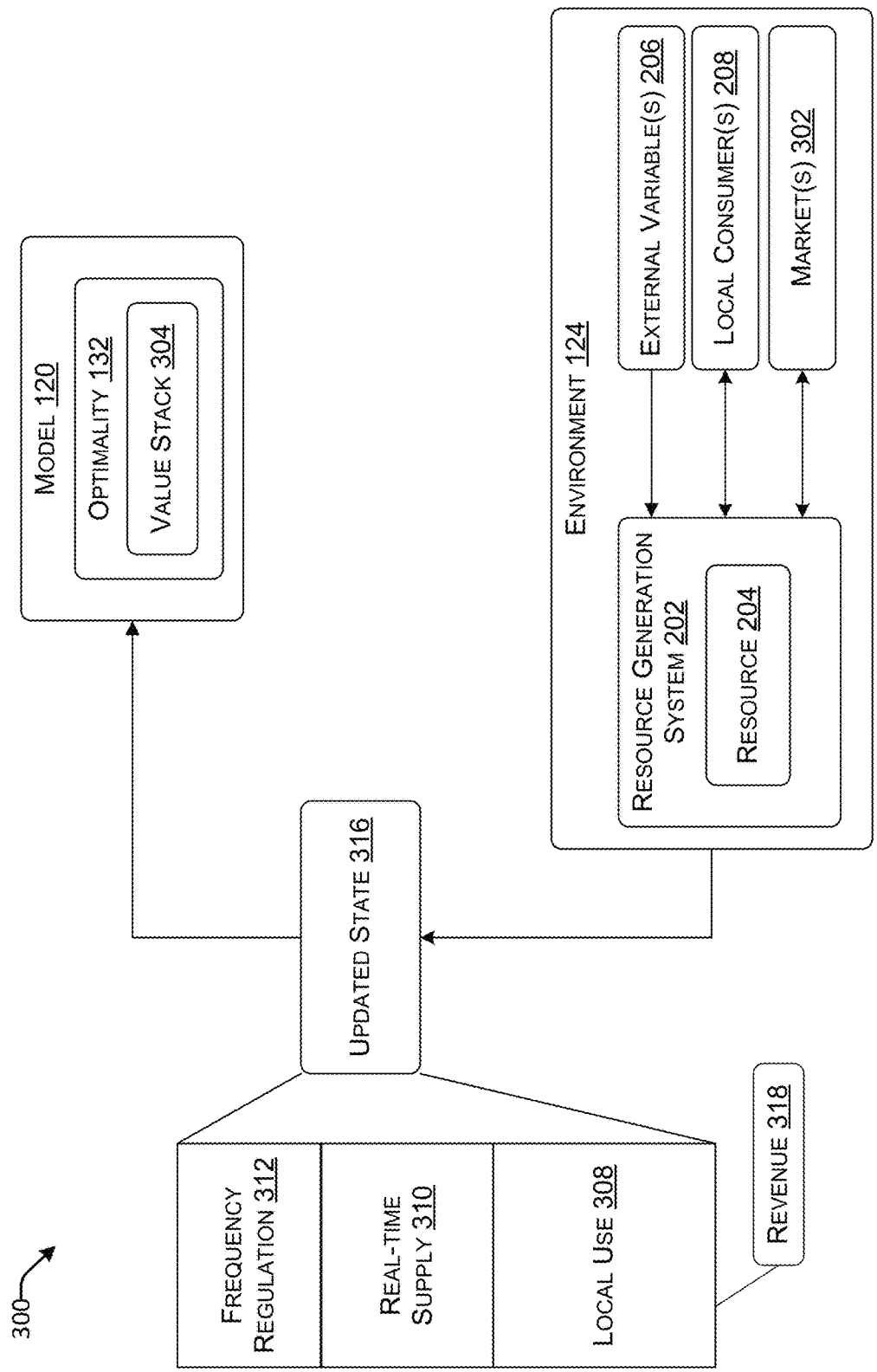
FIG. 3C illustrates a second state of the system for utilizing a model to compute policies for controlling resource generation and distribution.

In response to applying the actions 128 defined by the policy 126, the model 120 can extract an updated state 316 as shown in FIG. 3C. As mentioned above, the updated state 316 can define various aspects of the environment 124 that changed as a result of the policy 126 and/or aspects of the environment 124 that changed in the time following the application of the policy 126. For instance, in response to dispatching the resource 204 to the local consumers 208, demand for the resource 204 may have subsided. Accordingly, the next iteration of the policy 126 can allocate a reduced amount of the resource 204 to the local consumers 208. In another example, a resource price at the markets 302 may have recently increased. In response, the next iteration of the policy 126 can direct the resource generation system 202 to dispatch more of the resource 204 to the markets 302. Furthermore, the updated state 316 can define the revenue 318 obtained by the resource generation system 202 in response to implementing the resource allocation 306 defined by the policy 126.

In various examples, the revenue 318 can be expressed in relation to the various categories of the resource allocation 306. As shown, the resource generation system 202 can obtain revenue 318 from local use 308 by local consumers 208, as well as by providing real-time supply 310 and frequency regulation 312 services to the markets 302. Naturally, revenue 318 may not be obtained for holding resource 204 in reserves 314. It should be understood that the revenue 318 obtained from dispatching the resource 204 to the various categories of the resource allocation 306 can result in proportional revenue 318. For example, consider an environment 124 in which the local consumer 208 is a computing center 108 which provides various services to a computation market 116. In this example, the computation market 116 can be considered a market 302. Accordingly, the revenue 318 for local use 308 can be a result of dispatching the resource 204 to the local consumer 208 for processing workloads 110 from the computation market 116.

Alternatively, the revenue 318 obtained for a category of the resource allocation 306 can also be disproportionate to the amount of resource 204 dispatched. For example, the resource allocation 306 specified a relatively small amount of resource 204 for dispatch to frequency regulation 312. However, the price associated with frequency regulation 312 services can momentarily increase due to high demand. As such, the resource generation system 202 can advantageously dispatch some of the resource 204 to benefit from the price spike. As mentioned above, the dispatching of the resource 204 can be in response to a price of the market 302 meeting or exceeding a threshold price. Logically, the revenue 318 can be considered a second component of the value stack 304 in addition to the resource allocation 306.

Based on the updated state 316, the model 120 can calculate an optimality 132 that quantifies the efficacy of the policy 126 and the actions 128. For instance, the optimality 132 can be a numerical score that enables the model 120 to quantitatively evaluate various policies 126 (e.g., within a simulated environment 124) to select a most optimal policy 126. In addition, the model 120 can be configured to increase the optimality 132 by iteratively developing a realistically optimal policy 126. One component of the optimality 132 can be expressed as the value stack 304. As discussed, the value stack 304 can include the resource allocation 306 as well as the resultant revenue 318 from dispatching the resource 204 accordingly. In the context of renewable energy, the model 120 can be configured to optimize the value stack 304 thereby maximizing the revenue obtained by the resource generation system 202.

Figure 3D:
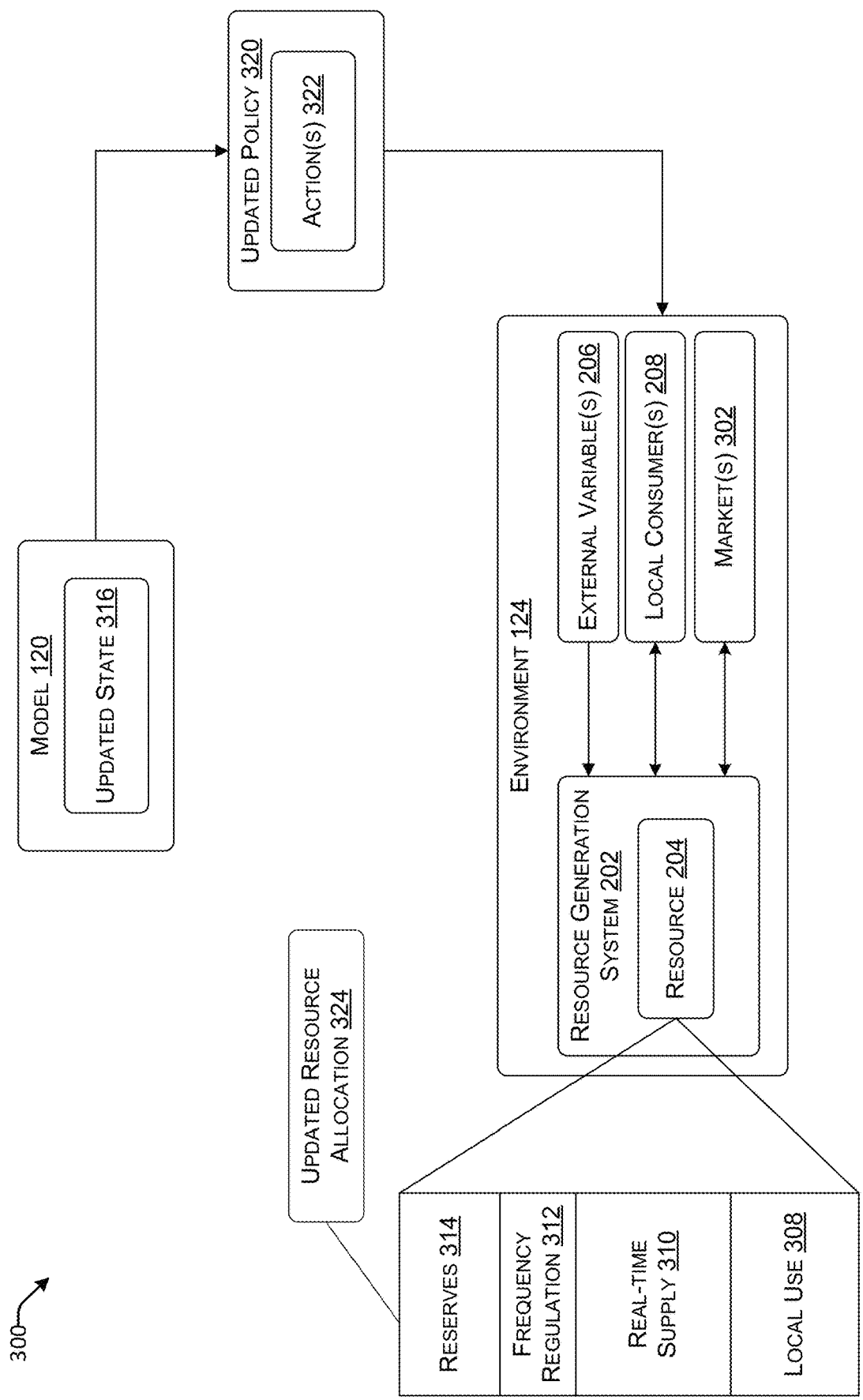
FIG. 3D illustrates a third state of the system for utilizing a model to compute policies for controlling resource generation and distribution.

As shown in FIG. 3D, the model 120 can determine an updated policy 320 based on the updated state 316. The updated policy 320 can define a revised set of actions 322 with the aim of increasing the optimality 132. This can be achieved by modifying the resource allocation 306 to generate an updated resource allocation 324. The updated resource allocation 324 can define changed proportions of the resource 204 to be dispatched to the local consumers 208 and/or the markets 302 according to current conditions of the environment 124 as captured by the update state 316. For example, the updated resource allocation 324 decreases the amount of resource 204 that is dispatched to the local consumers 208 for local use 308. This can be due to decreased demand from the local consumers 208 as needs were met by the previous iteration of the policy 126. In contrast, the updated resource allocation 324 can specify an increased amount of the resource 204 that is dispatched to the markets 302 for real-time supply 310. In one example, the model can detect an increased demand and thus price for the real-time supply 310 via the updated state 316. To capitalize on the current price, the updated policy 320 can direct the resource generation system 202 to dispatch more resource 204 to the real-time supply 310 market 302 via the updated resource allocation 324.

Figure 4:
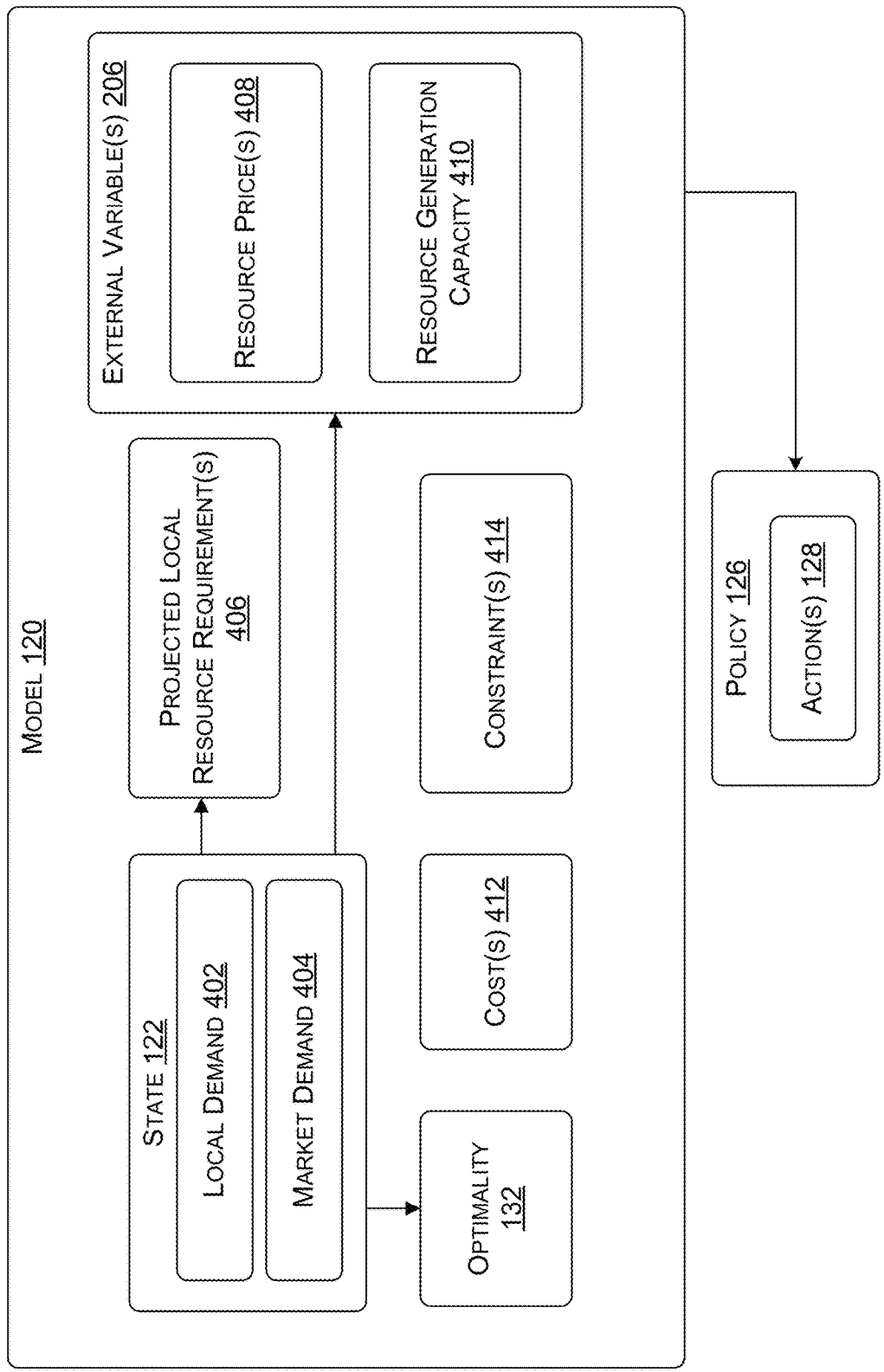
FIG. 4 illustrates aspects of the model for computing policies for controlling resource generation and distribution.

Turning now to FIG. 4, aspects of the data-driven model 120 are shown and described. As mentioned above, the model 120 can be any suitable method for analyzing a state 122 and determining a policy 126 based on the state 122. For instance, the model 120 can be a machine learning system such as reinforcement learning that can be configured to autonomously analyze and derive policies 126. Alternatively, the model 120 can be a statistical model that ingests parameters derived from the state 122 to compute a policy 126 using predetermined rules which can be set manually or automatically.

As discussed above, the state 122 can include information on various aspects of an environment 124. For instance, the state 122 can include data defining local demand 402 and market demand 404 for a resource 204. For example, in the context of renewable energy, the local demand 402 can define current loads at a local consumer 208 that can influence resource consumption such as the workloads 110 at a computing center 108. Similarly, the market demand 404 can quantify factors that affect resource consumption at various markets 302. Based on the local demand 402, the data-driven model 120 can determine a projected local resource requirement 406 for local consumers 208. In various examples, the projected local resource requirement 406 can define a quantity of resource 204 that a local consumer 208 is most likely to consume for a specific period of time into the future. For instance, the projected local resource requirement 406 can specify that, based on the number of pending workloads 110, a computing center 108 is most likely to consume five megawatt hours of electricity over the next twenty-four hours. Accordingly, the policy 126 generated by the model 120 can direct a resource generation system 202 to allocate the requisite amount of the resource 204 for the local consumer 208.

The projected local resource requirement 406 can additionally be adjusted by the model 120 to free up and/or divert resources 204. For example, local demand 402 imposed by various resource loads may require a certain amount of a resource 204 to address. However, the full local demand 402 may not need to be addressed all at once. Stated another way, portions of the local demand 402 can be time-shifted to enable the model 120 to redirect some of the resource 204. For instance, as discussed above with regard to FIG. 1, some workloads 110 at a computing center 108 can be rescheduled to scale down power consumption. This can free up energy 104 for sale at various energy markets 112. The choice to reschedule workloads 110 to scale down the computing center 108 can be initiated in response to an increase in energy prices 114. For instance, the model 120 can be configured to maximize the revenue 318 obtained for a given amount of the resource 204. As such, the model 120 must be enabled to dynamically redirect the resource 204 if a more optimal strategy for maximizing value is discovered. Alternatively, the workloads 100 can be time-shifted by scaling down performance of the computing center 108 to free up energy 104 for sale.

In addition to the state, the model 120 can receive external variables 206 that further define aspects of an environment 124 external to the resource generation system 202. As shown, the external variables 206 can include resource prices 408 associated with the various markets 302. The external variables 206 can also include a resource generation capacity 410 of the resource generation system 202. While the resource generation capacity 410 can be inherent to the resource generation system 202, it can also be subject to unpredictable and/or uncontrollable conditions. For instance, the resource generation capacity 410 of a renewable energy generator 102 can be subject to current weather conditions (e.g., sun or wind). As such, the resource generation capacity 410 can be considered a component of the external variables 206.

In various examples, the external variables 206 can be retrieved from an environment 124 as part of the state 122 and subsequently extracted by the model 120. Alternatively, the external variables 206 can be retrieved by the model 120 independently of the state 122. In this way, the timing of various operations can be managed with high granularity. For instance, the model 120 may be configured to extract a state 122 from the environment 124 once every six hours. However, due to the volatility of various external variables 206 such as resource prices 408 and weather conditions that may affect the resource generation capacity 410, the model 120 may additionally be configured to retrieve external variables 206 every hour. Accordingly, the policy 126 can be adjusted using the state 122 and/or the external variables 206 according to preferences configured by an administrator such as a system engineer.

Furthermore, the data-driven model 120 can be configured with various costs 412 associated with operating the resource generation system 202. Costs 412 can be characterized in terms of monetary cost, time cost, equipment cost (e.g., wear and tear), as well as any other relevant costs. As described above, the model 120 can primarily aim to maximize revenue 318 obtained from dispatching the resource 204. A component of this optimization can include minimizing the effects of the various costs 412. For example, holding a resource 204 in reserve can represent minimal cost 412 but also generate no value for a value stack 304. Conversely, dispatching a resource 204 to a market 302 can incur equipment, time, and/or monetary costs 412 while generating significant value. As such, the model 120 must select actions 128 for the policy 126 with consideration for the value they generate in relation the associated costs 412.

Moreover, the model 120 can be configured with constraints 414 that define various restrictions on actions 128 that ensure a policy 126 generated by the model 120 are realistic and technically feasible for a given resource generation system 202. For instance, the constraints 414 can relate to technical limitations of various components of the resource generation system 202 such as a maximum storage capacity of the resource 204, a maximum storage rate, a maximum generation rate, and so forth. In another example, the constraints 414 can relate to physical constraints that define physical laws that the model 120 cannot violate under any circumstances as doing so would render the policy 126 useless in practical contexts. In this way, the model 120 is constrained to only produce policies that can be realistically implemented whereas naïve applications of a model 120 would result in many policies 126 that would need to be discarded as physically impossible.

With consideration of a diverse set of factors such as the projected local resource requirements 406, external variables 206, and the constraints 414, the model 120 can determine a policy 126 defining various actions 128. As described above, the policy 126 can govern operations of the various components of a resource generation system 202. In response to applying the policy 126, the model 120 can extract a state 122 that captures the effects of the policy 126 such as the value stack 304 discussed above. The model 120 can calculate an optimality 132 from the state to quantify the successes and/or failures of the policy 126. From the optimality 132, the model 120 can generate additional iterations of the policy 126 to further increase the optimality 132.

Figure 5:
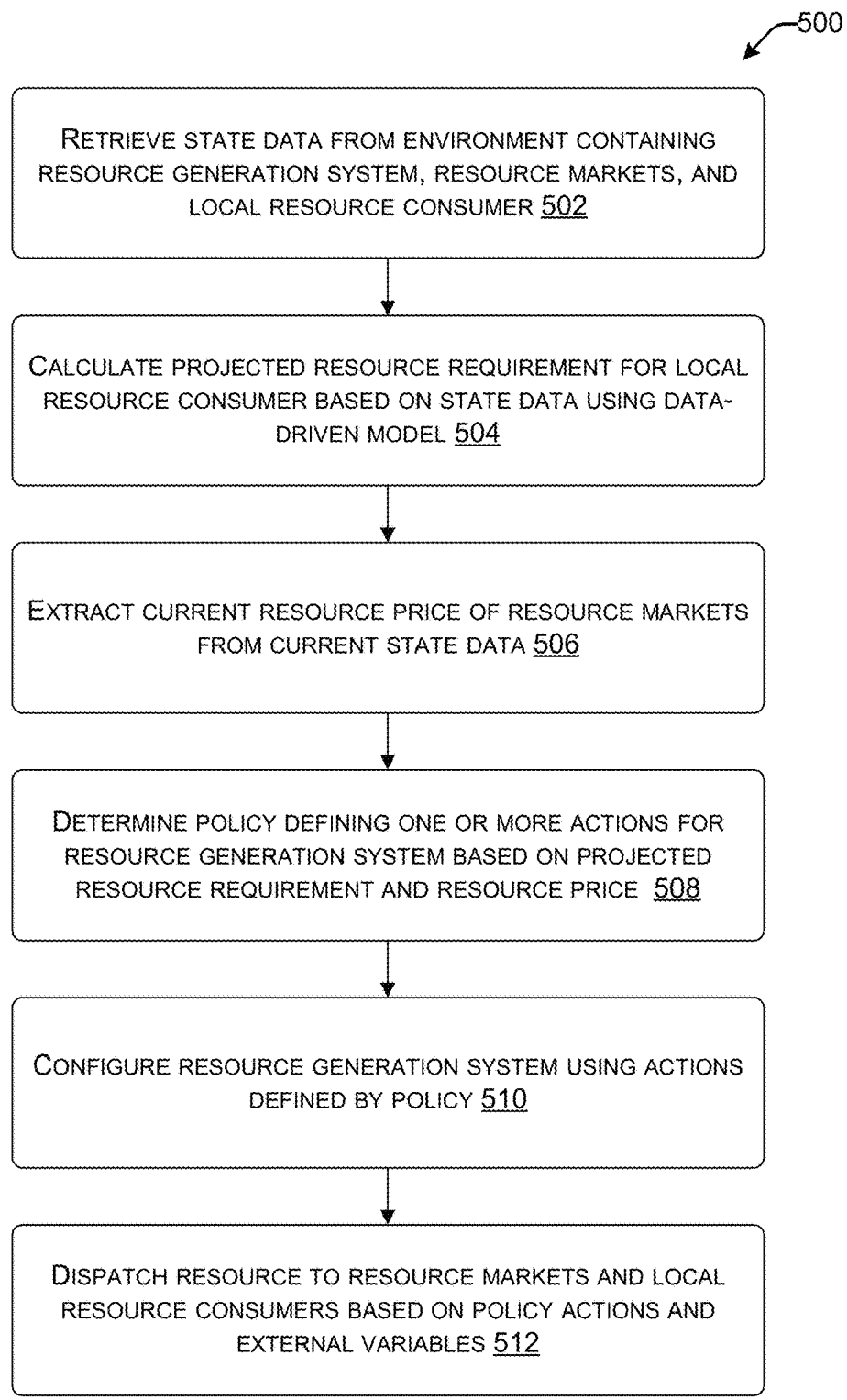
FIG. 5 is a flow diagram showing aspects of a routine for optimizing resource generation and dispatch for local consumers and resource markets.

Turning now to FIG. 5, aspects of a routine 500 for enabling optimized resource generation and dispatch are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified and/or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, routine 500 begins at operation 502 where a system retrieves data defining a current state of an environment containing a resource generation system, one or more resource markets, and a local resource consumer.

Next, at operation 504, the system calculates a projected resource requirement for the local resource consumer based on the current state using a data-driven model. The data-driven model can be implemented using any suitable method such as a machine learning model, a statistical model, and the like.

Then, at operation 506, the system extracts a current resource price of the one or more resource markets from the current state.

Subsequently, at operation 508, the data-driven model determines a policy defining one or more actions with respect to the resource generation system based on the projected resource requirement and resource prices.

Next, at operation 510, the system configures the resource generation system using the actions defined by the policy.

Finally, at operation 512, the resource generation system dispatches resources to the one or more resource markets and the local resource consumer using the actions defined by the policy and one or more external variables that affect resource dispatch.

Figure 6:
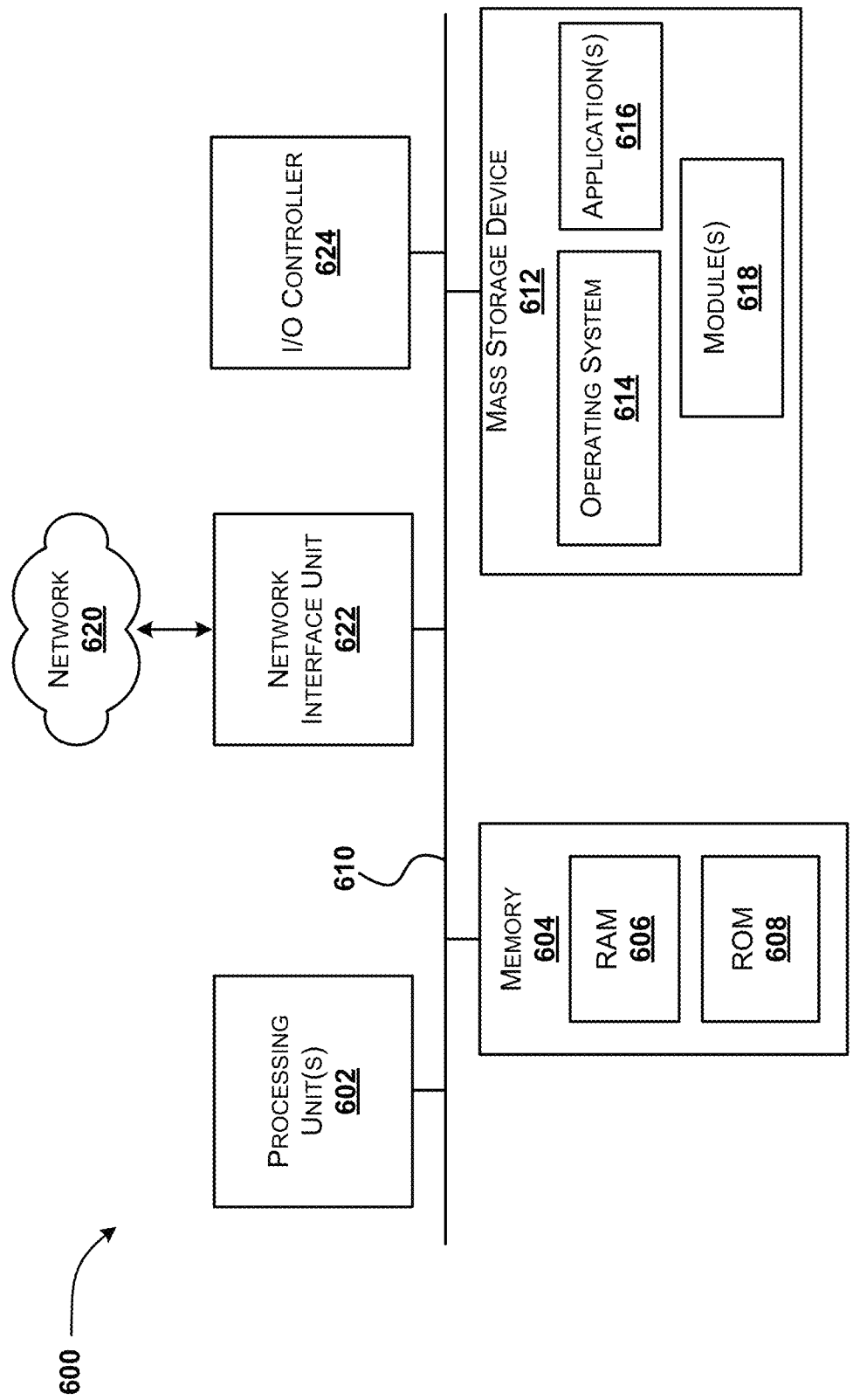
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing unit(s) 602, a system memory 604, including a random-access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
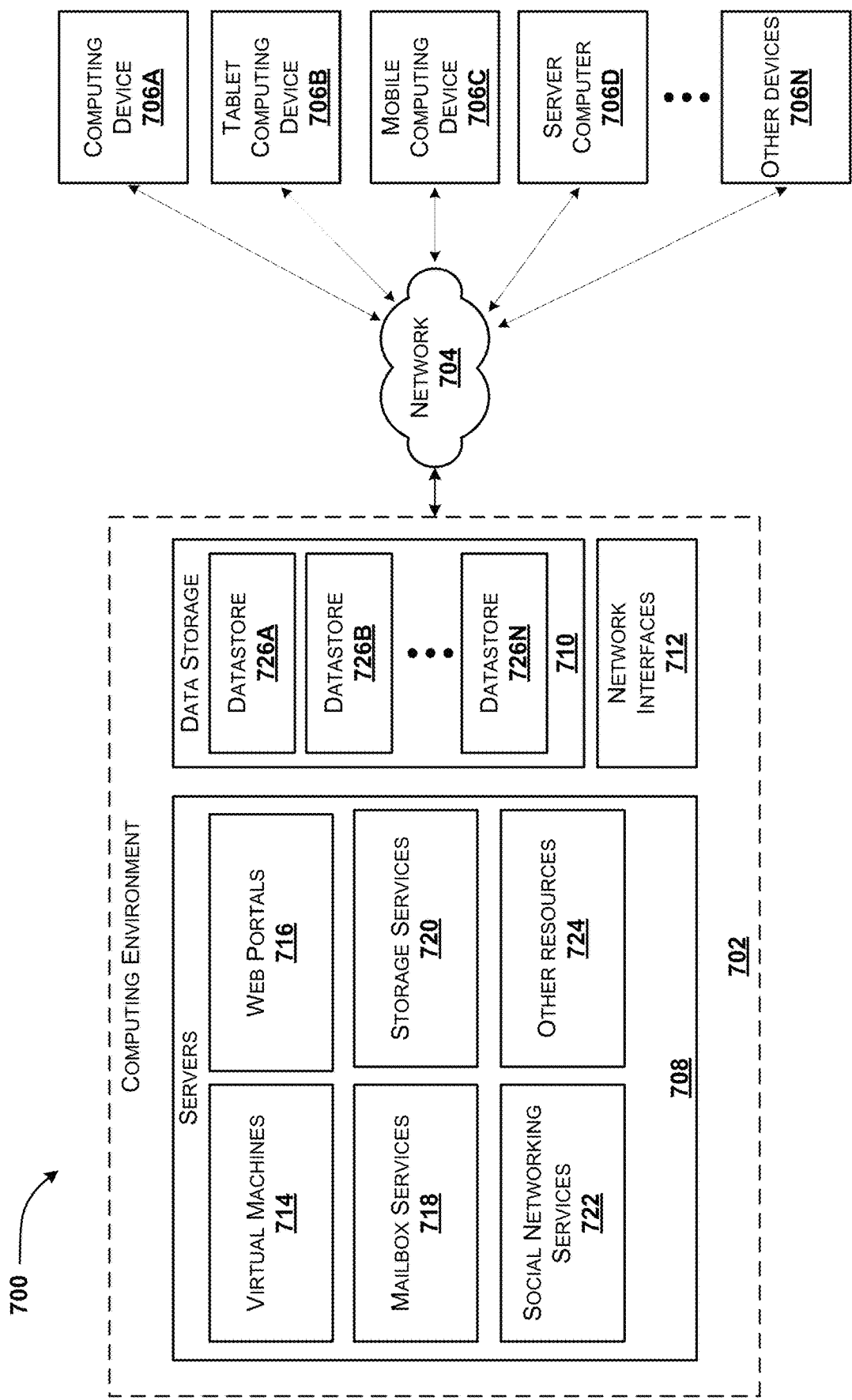
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: retrieving, using one or more processing units, a current state from an environment containing a resource generation system, one or more resource markets, and a local resource consumer; calculating, based on the current state, a projected resource requirement of the local resource consumer a data-driven model; extracting, from the current state, a current resource price of the one or more resource markets; determining, based on the projected resource requirement and the current resource price, a policy defining one or more actions that are taken with respect to the resource generation system in the environment; configuring the resource generation system using the one or more actions defined by the policy; and dispatching a resource of the resource generation system to the one or more resource markets and the local resource consumer based on the one or more actions defined by the policy and one or more external variables that have an effect on a timing of the dispatching.

Example Clause B, the method of Example Clause A, further comprising: retrieving a modified state from the environment in response to applying the one or more actions defined by the policy determined by the data-driven model; determining a level of optimality based on the modified state and the application of the policy in the environment; and modifying the one or more actions of the policy to increase the level of optimality.

Example Clause C, the method of Example Clause A or Example Clause B, wherein the projected resource requirement of the local resource consumer is adjusted by the data-driven model based on a priority of one or more resource loads of the local resource consumer.

Example Clause D, the method of any one of Example Clause A through C, wherein the current state includes a resource generation rate of the resource generation system, a current demand of the local resource consumer, and a resource demand of the one or more resource markets.

Example Clause E, the method of any one of Example Clause A through D, wherein the policy is further determined based on a cost of storing the resource and a cost of dispatching the resource to the one or more resource markets and the local resource consumer.

Example Clause F, the method of any one of Example Clause A through E, wherein the resource is electrical energy, and the resource generation system is a renewable energy system.

Example Clause G, the method of any one of Example Clause A through F, wherein a rate at which the resource generation system generates the resource varies over time.

Example Clause H, a system comprising: one or more processing units; and computer readable media having encoded thereon computer-readable instructions that when executed by the one or more processing units, causes the system to: retrieve a current state from an environment containing a resource generation system, one or more resource markets, and a local resource consumer; calculate, based on the current state, a projected resource requirement of the local resource consumer using a data-driven model; extract, from the current state, a current resource price of the one or more resource markets; determine, based on the projected resource requirement and the current resource price, a policy defining one or more actions that are taken with respect to the resource generation system in the environment; configure the resource generation system using the one or more actions defined by the policy; and dispatch a resource of the resource generation system to the one or more resource markets and the local resource consumer based on the one or more actions defined by the policy and one or more external variables that have an effect on a timing of the dispatching.

Example Clause I, the system of Example Clause H, wherein the computer-readable instructions further cause the system to: retrieve a modified state from the environment in response to applying the one or more actions defined by the policy determined by the data-driven model; determine a level of optimality based on the modified state and the application of the policy in the environment; and modify the one or more actions of the policy to increase the level of optimality.

Example Clause J, the system of Example Clause H or Example Clause I, wherein the projected resource requirement of the local resource consumer is adjusted by the data-driven model based on a priority of one or more resource loads of the local resource consumer.

Example Clause K, the system of any one of Example Clause H through J, wherein the current state includes a resource generation rate of the resource generation system, a current demand of the local resource consumer, and a resource demand of the one or more resource markets.

Example Clause L, the system of any one of Example Clause H through K, wherein the policy is further determined based on a cost of storing the resource and a cost of dispatching the resource to the one or more resource markets and the local resource consumer.

Example Clause M, the system of any one of Example Clause H through L, wherein the resource is electrical energy, and the resource generation system is a renewable energy system.

Example Clause N, the system of any one of Example Clause H through M, wherein a rate at which the resource generation system generates the resource varies over time.

Example Clause O, a computer-readable storage medium, having encoded thereon computer-readable instructions that when executed by one or more processing units, cause a system to: retrieve a current state from an environment containing a resource generation system, one or more resource markets, and a local resource consumer; calculate, based on the current state, a projected resource requirement of the local resource consumer using a data-driven model; extract, from the current state, a current resource price of the one or more resource markets; determine, based on the projected resource requirement and the current resource price, a policy defining one or more actions that are taken with respect to the resource generation system in the environment; configure the resource generation system using the one or more actions defined by the policy; and dispatch a resource of the resource generation system to the one or more resource markets and the local resource consumer based on the one or more actions defined by the policy and one or more external variables that have an effect on a timing of the dispatching.

Example Clause P, the computer-readable storage medium of Example Clause O, wherein the computer-readable instructions further cause the system to: retrieve a modified state from the environment in response to applying the one or more actions defined by the policy determined by the data-driven model; determine a level of optimality based on the modified state and the application of the policy in the environment; and modify the one or more actions of the policy to increase the level of optimality.

Example Clause Q, the computer-readable storage medium of Example Clause O or Example Clause P, wherein the projected resource requirement of the local resource consumer is adjusted by the data-driven model based on a priority of one or more resource loads of the local resource consumer.

Example Clause R, the computer-readable storage medium of any one of Example Clause O through Q, wherein the current state includes a resource generation rate of the resource generation system, a current demand of the local resource consumer, and a resource demand of the one or more resource markets.

Example Clause S, the computer-readable storage medium of any one of Example Clause O through R, wherein the policy is further determined based on a cost of storing the resource and a cost of dispatching the resource to the one or more resource markets and the local resource consumer.

Example Clause T, the computer-readable storage medium of any one of Example Clause O through S, wherein the resource is electrical energy, and the resource generation system is a renewable energy system.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resource markets).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
   retrieving, using one or more processing units, a current state from an environment containing a resource generation system, a local resource consumer that is coupled to the resource generation system, and one or more resource markets external to the local resource consumer;
   calculating, by a reinforcement learning model, a projected resource requirement of the local resource consumer for a future period of time based on a current resource demand of the local resource consumer;
   extracting, from the current state, a current resource price of the one or more resource markets;
   adjusting, by the reinforcement learning model, the projected resource requirement of the local resource consumer to decrease demand based on a priority of one or more resource loads of the local resource consumer and the current resource price of the one or more resource markets;
   determining, by the reinforcement learning model, a policy defining one or more actions that are taken with respect to the resource generation system in the environment based on the adjusted projected resource requirement of the local resource consumer and the current resource prices wherein the policy first satisfies the adjusted projected resource requirement of the local resource consumer before dispatching remaining resource to the one or more resource markets to maximize a value obtained from the one or more resource markets in accordance with the current resource price;
   configuring the resource generation system to perform the one or more actions defined by the policy for a predefined time period, wherein an individual action causes the resource generation system to perform one of a resource generation action, a resource storage action, and a resource dispatch action;
   dispatching a resource of the resource generation system to the local resource consumer and the one or more resource markets based on the one or more actions defined by the policy;
   retrieving a modified state from the environment in response to dispatching the resource of the resource generation system to the local resource consumer and the one more resource markets based on the one or more actions defined by the policy;
   calculating, by the reinforcement learning model, a level of optimality based on the modified state;
   modifying the one or more actions defined by the policy to increase the level of optimality;
   configuring the resource generation system to perform the one or more modified actions defined by the policy for an additional predefined time period; and
   dispatching additional resource of the resource generation system to the local resource consumer and the one or more resource markets based on the one or more modified actions defined by the policy.

2. The method of claim 1, wherein the current state includes at least one of a resource generation rate of the resource generation system, a current demand of the local resource consumer, or a resource demand of the one or more resource markets.

3. The method of claim 1, wherein the policy is further determined based on a cost of storing the resource and a cost of dispatching the resource to the one or more resource markets and the local resource consumer.

4. The method of claim 1, wherein the resource is electrical energy, and the resource generation system is a renewable energy system.

5. The method of claim 1, wherein a rate at which the resource generation system generates the resource varies over time.

6. A system comprising:
   one or more processing units; and
   computer readable media having encoded thereon computer-readable instructions that when executed by the one or more processing units, causes the system to:
   retrieve a current state from an environment containing a resource generation system, a local resource consumer that is coupled to the resource generation system, and one or more resource markets external to the local resource consumer;
   calculate, by a reinforcement learning model, a projected resource requirement of the local resource consumer for a future period of time based on a current resource demand of the local resource consumer;

extract, from the current state, a current resource price of the one or more resource markets;

adjust, by the reinforcement learning model, the projected resource requirement of the local resource consumer to decrease demand based on a priority of one or more resource loads of the local resource consumer and the current resource price of the one or more resource markets;

determine, by the reinforcement learning model, a policy defining one or more actions that are taken with respect to the resource generation system in the environment based on the adjusted projected resource requirement of the local consumer and the current resource price, wherein the policy first satisfies the adjusted projected resource requirement of the local consumer before dispatching remaining resource to the one or more resource markets to maximize a value obtained from the one or more resource markets in accordance with the current resource price;

configure the resource generation system to perform the one or more actions defined by the policy for a predefined time period, wherein an individual action causes the resource generation system to perform one of a resource generation action, a resource storage action, and a resource dispatch action;

dispatch a resource of the resource generation system to the local resource consumer and the one or more resource markets based on the one or more actions defined by the policy;

retrieve a modified state from the environment in response to dispatching the resource of the resource generation system to the local resource consumer and the one more resource markets based on the one or more actions defined by the policy;

calculate, by the reinforcement learning model, a level of optimality based on the modified state;

modify the one or more actions defined by the policy to increase the level of optimality;

configure the resource generation system to perform the one or more modified actions defined by the policy for an additional predefined time period; and dispatch additional resource of the resource generation system to the local resource consumer and the one or more resource markets based on the one or more modified actions defined by the policy.

7. The system of claim 6, wherein the current state includes at least one of a resource generation rate of the resource generation system, a current demand of the local resource consumer, or a resource demand of the one or more resource markets.

8. The system of claim 6, wherein the policy is further determined based on a cost of storing the resource and a cost of dispatching the resource to the one or more resource markets and the local resource consumer.

9. The system of claim 6, wherein the resource is electrical energy, and the resource generation system is a renewable energy system.

10. The system of claim 6, wherein a rate at which the resource generation system generates the resource varies over time.

11. A computer-readable storage medium, having encoded thereon computer-readable instructions that when executed by one or more processing units, cause a system to:

retrieve a current state from an environment containing a resource generation system, a local resource consumer that is coupled to the resource generation system, and one or more resource markets external to the local resource consumer;

calculate, by a reinforcement learning model, a projected resource requirement of the local resource consumer for a future period of time based on a current resource demand of the local resource consumer;

extract, from the current state, a current resource price of the one or more resource markets;

adjust, by the reinforcement learning model, the projected resource requirement of the local resource consumer to decrease demand based on a priority of one or more resource loads of the local resource consumer and the current resource price of the one or more resource markets;

determine, by the reinforcement learning model, a policy defining one or more actions that are taken with respect to the resource generation system in the environment based on the adjusted projected resource requirement of the local consumer and the current resource price, wherein the policy first satisfies the adjusted projected resource requirement of the local consumer before dispatching remaining resource to the one or more resource markets to maximize a value obtained from the one or more resource markets in accordance with the current resource price;

configure the resource generation system to perform the one or more actions defined by the policy for a predefined time period, wherein an individual action causes the resource generation system to perform one of a resource generation action, a resource storage action, and a resource dispatch action;

dispatch a resource of the resource generation system to the local resource consumer and the one or more resource markets based on the one or more actions defined by the policy;

retrieve a modified state from the environment in response to dispatching the resource of the resource generation system to the local resource consumer and the one more resource markets based on the one or more actions defined by the policy;

calculate, by the reinforcement learning model, a level of optimality based on the modified state;

modify the one or more actions defined by the policy to increase the level of optimality;

configure the resource generation system to perform the one or more modified actions defined by the policy for an additional predefined time period; and dispatch additional resource of the resource generation system to the local resource consumer and the one or more resource markets based on the one or more modified actions defined by the policy.

12. The computer-readable storage medium of claim 11, wherein the current state includes at least one of a resource generation rate of the resource generation system, a current demand of the local resource consumer, or a resource demand of the one or more resource markets.

13. The computer-readable storage medium of claim 11, wherein the policy is further determined based on a cost of storing the resource and a cost of dispatching the resource to the one or more resource markets and the local resource consumer.

14. The computer-readable storage medium of claim 11, wherein the resource is electrical energy, and the resource generation system is a renewable energy system.

* * * * *